(12) United States Patent
Park (10) Patent No.: US 12,481,918 B2
(45) Date of Patent: Nov. 25, 2025

(54) METHOD AND APPARATUS FOR IMPROVING PERFORMANCE OF CLASSIFICATION ON THE BASIS OF MIXED SAMPLING

(71) Applicant: ELECTRONICS AND TELECOMMUNICATIONS RESEARCH INSTITUTE, Daejeon (KR)

(72) Inventor: Won Joo Park, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 918 days.

(21) Appl. No.: 17/702,156

(22) Filed: Mar. 23, 2022

(65) Prior Publication Data
US 2022/0309401 A1     Sep. 29, 2022

(30) Foreign Application Priority Data
Mar. 24, 2021     (KR) .................. 10-2021-0038141

(51) Int. Cl.
*G06N 20/00*     (2019.01)
*G06F 16/28*     (2019.01)
*G06N 5/04*     (2023.01)

(52) U.S. Cl.
CPC .......... *G06N 20/00* (2019.01); *G06F 16/285* (2019.01); *G06N 5/04* (2013.01)

(58) Field of Classification Search
CPC .......... G06N 20/00; G06N 5/04; G06N 3/045; G06N 3/08; G06N 20/20; G06F 16/285; G06F 16/906; G06F 18/214; G06F 18/2413
See application file for complete search history.

(56) References Cited

U.S. PATENT DOCUMENTS

| | | | |
|---|---|---|---|
| 7,725,408 B2 | 5/2010 | Lee et al. | |
| 10,089,109 B2* | 10/2018 | Shukla | G06Q 10/06398 |
| 11,620,558 B1* | 4/2023 | Xu | G06N 7/01 |
| | | | 706/12 |
| 11,734,937 B1* | 8/2023 | Pushkin | G06F 18/2155 |
| | | | 706/12 |
| 11,756,572 B2* | 9/2023 | Shor | G06N 3/088 |
| | | | 704/243 |
| 11,892,897 B2* | 2/2024 | Shakarian | G06F 18/2148 |
| 11,893,772 B1* | 2/2024 | Gokalp | G06V 10/758 |

(Continued)

FOREIGN PATENT DOCUMENTS

| | | |
|---|---|---|
| JP | 2020149618 A | 9/2020 |
| KR | 1020170107283 A | 9/2017 |

(Continued)

*Primary Examiner* — Hien L Duong
(74) *Attorney, Agent, or Firm* — Rabin & Berdo, P.C.

(57) ABSTRACT

A method of improving performance of classification on the basis of mixed sampling is applied. The present invention is directed to providing a method and apparatus for improving the performance of classification on the basis of mixed sampling that are capable of, when learning a model that classifies types using deep learning by dividing the entire data set and using the divided data set for training, validation, and testing, applying different sampling techniques by types of data according to the characteristics of the training data in order to improve the classification performance.

12 Claims, 6 Drawing Sheets

(56) References Cited

U.S. PATENT DOCUMENTS

| | | | |
|---|---|---|---|
| 2013/0097103 A1* | 4/2013 | Chari | G06N 20/10 707/E17.089 |
| 2014/0297570 A1* | 10/2014 | Garera | G06Q 50/01 706/12 |
| 2014/0372351 A1* | 12/2014 | Sun | G06Q 10/063 706/12 |
| 2020/0005901 A1* | 1/2020 | Cohen | G06N 20/20 |
| 2020/0242154 A1* | 7/2020 | Haneda | G06F 16/535 |
| 2021/0012213 A1 | 1/2021 | Kim et al. | |
| 2021/0027143 A1 | 1/2021 | Joo | |
| 2021/0073660 A1* | 3/2021 | Zhang | G06N 5/04 |
| 2021/0192288 A1* | 6/2021 | Cao | G06N 20/00 |
| 2021/0224696 A1* | 7/2021 | Nasr-Azadani | G06N 5/01 |
| 2021/0233615 A1* | 7/2021 | Banavar | G16H 40/67 |
| 2021/0264260 A1* | 8/2021 | Kim | G06N 3/04 |
| 2021/0312351 A1* | 10/2021 | Pourmohammad | G06F 16/906 |
| 2021/0319333 A1* | 10/2021 | Lee | G06N 3/08 |
| 2022/0012535 A1* | 1/2022 | Ben-Itzhak | G06F 18/2148 |
| 2022/0019848 A1* | 1/2022 | Takayama | G06F 16/53 |
| 2022/0083856 A1* | 3/2022 | Yaguchi | G06N 3/045 |
| 2022/0120727 A1* | 4/2022 | Al-Dabbagh | G06F 16/285 |
| 2022/0172342 A1* | 6/2022 | Zepeda Salvatierra | G06V 30/19147 |
| 2022/0207352 A1* | 6/2022 | Barr | G06F 17/18 |
| 2022/0253526 A1* | 8/2022 | Sanders | G06N 3/08 |

FOREIGN PATENT DOCUMENTS

| | | |
|---|---|---|
| KR | 20190135329 A | 12/2019 |
| KR | 20190140824 A | 12/2019 |
| KR | 20200027834 A1 | 3/2020 |
| KR | 1020200110400 A | 9/2020 |
| KR | 102283283 B1 | 7/2021 |

\* cited by examiner

METHOD AND APPARATUS FOR IMPROVING PERFORMANCE OF CLASSIFICATION ON THE BASIS OF MIXED SAMPLING

CROSS-REFERENCE TO RELATED APPLICATION

This application claims priority to and the benefit of Korean Patent Application No. 10-2021-0038141, filed on Mar. 24, 2021, the disclosure of which is incorporated herein by reference in its entirety.

BACKGROUND

1. Field of the Invention

The present invention relates to a method and apparatus for improving the performance of classification on the basis of mixed sampling.

2. Discussion of Related Art

Currently, the technologies for classification based on deep learning, is modeled through learning target data and a label of each piece of the data, and based on input of new data, the labels are inferred on the basis of the trained model.

Recently, research has been actively conducted on the development of deep learning models that may be used for classification, recognition, etc., and whenever a new model is introduced, new state-of-the-art (SOTA) results are presented. However, when applying the latest technologies and models to actual data, there is a limit to improving the performance only by improving the model.

In particular, when supervised learning is used, the accuracy of the target data and the label of the data is a very important factor in the model performance.

RELATED ART DOCUMENTS

Patent Document

Korean Laid-open Patent Publication No. 10-2017-0107283 (Sep. 25, 2017)

SUMMARY OF THE INVENTION

The present invention is directed to providing a method and apparatus for improving the performance of classification based on mixed sampling of training data that are capable of, when training a classification model using deep learning by dividing the entire data set and using the divided data set for training, validation, and testing, applying different sampling techniques according to the characteristics of the training data in order to improve the classification performance.

The technical objectives of the present invention are not limited to the above, and other objectives may become apparent to those of ordinary skill in the art based on the following description.

According to the first aspect of the present invention, there is provided a method of improving performance of classification on the basis of mixed sampling, the method including: dividing an entire data set requiring classification into training data and testing data; training an $N^{th}$ classification model on the basis of the training data; setting the testing data to an input of the $N^{th}$ classification model to provide type inference result; applying a mixed sampling technique to the next $(N+1^{th})$ training data based on characteristic information for each type group of the type inference result; reconstructing the training data based on mixed sampling for an $N+1^{th}$ classification model in which mixed sampling data according to a result of the applying of the mixed sampling technique is concatenated; training the $N+1^{th}$ classification model on the basis of the mixed sampling-based training data; and setting the testing data to an input of the $N+1^{th}$ classification model to provide type inference result.

According to the second aspect of the present invention, there is provided an apparatus for improving performance of classification on the basis of mixed sampling, the apparatus including a communication module, a memory, and a processor for executing a program stored in the memory, which is an apparatus, wherein the processor is configured to, according to execution of the program: divide an entire data set requiring classification into training data and testing data through a data pre-processing unit; train an $N^{th}$ classification model on the basis of the training data through a model training unit; set the testing data to an input of the $N^{th}$ classification model to provide type inference result through a model testing unit; evaluate characteristic information for each type group based on the type inference result to determine type groups through a model evaluation unit; and apply a mixed sampling technique to the training data and reconstruct the training data based on mixed sampling for an $N+1^{th}$ classification model, in which mixed sampling data according to a result of the application of the mixed sampling technique is concatenated, through the data pre-processing unit; train the $N+1^{th}$ classification model on the basis of the mixed sampling-based training data through the model training unit; and set the testing data to an input of the $N+1^{th}$ classification model to provide type inference result through the model testing unit.

Other specific details of the present invention are included in the specification and the accompanying drawings

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the advantages and features of the present invention and ways of achieving them will become readily apparent with reference to descriptions of the following detailed embodiments in conjunction with the accompanying drawings. However, the present invention is not limited to such embodiments and may be embodied in various forms. The embodiments to be described below are provided only to complete the disclosure of the present invention and assist those of ordinary skill in the art in fully understanding the scope of the present invention, and the scope of the present invention is defined only by the appended claims.

Terms used herein are used for aiding in the description and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof. In connection with assigning reference numerals to elements in the drawings, the same reference numerals are used for designating the same elements throughout the specification, and the term "and/or" includes any one or combinations of the associated listed items. It should be understood that, although the terms "first," "second," etc. may be used herein to describe various elements, these elements are not limited by these terms. These terms are only used for distinguishing one element from another. For example, a first element could be termed a second element without departing from the scope of the present invention.

Unless otherwise defined, all terms (including technical and scientific terms) used herein have the same meaning as commonly understood by one of ordinary skill in the art to which this invention belongs. It should be further understood that terms, such as those defined in commonly used dictionaries, should not be interpreted in an idealized or overly formal sense unless expressly specifically defined herein.

Hereinafter, a method of improving the performance of classification on the basis of mixed sampling according to an embodiment of the present invention will be described with reference to FIGS. 1 to 3.

Figure 1:
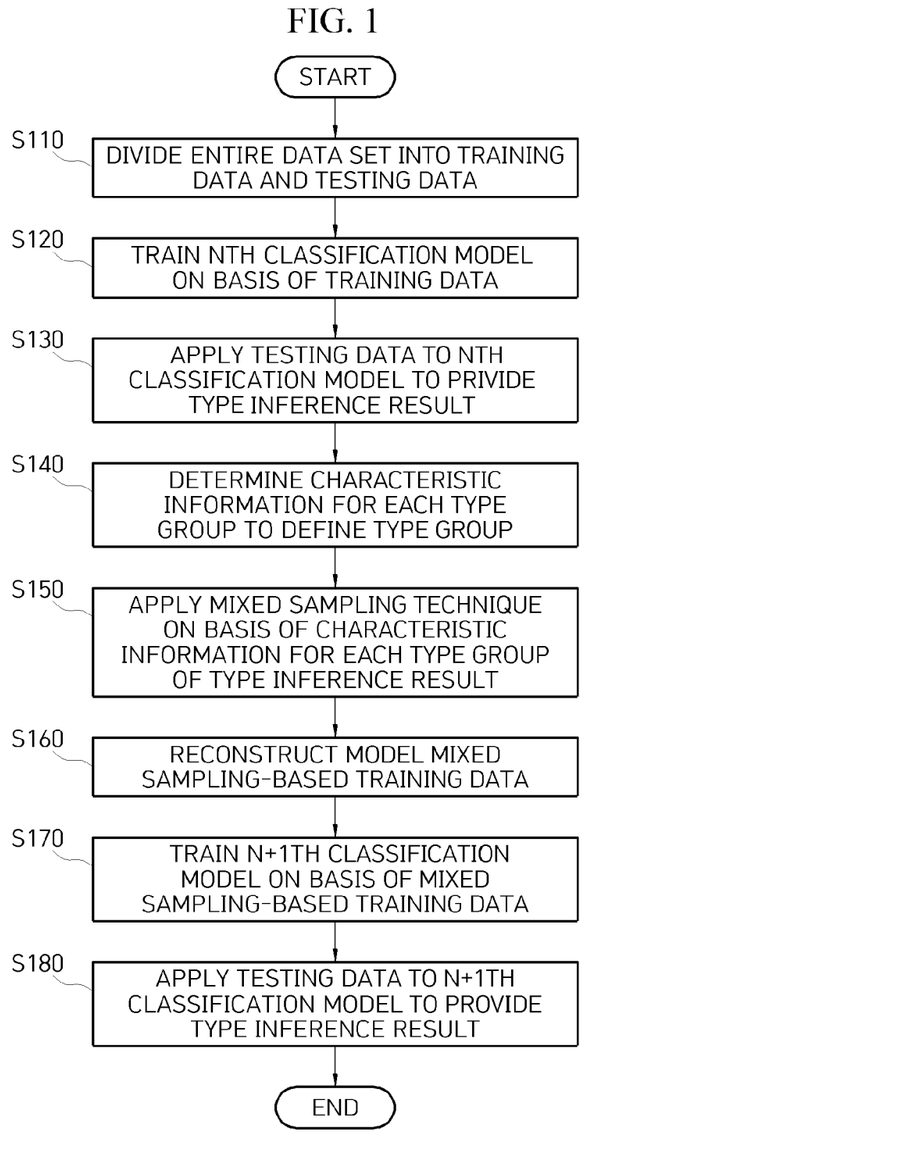
FIG. 1 is a flowchart showing a method of improving the performance of classification on the basis of mixed sampling according to an embodiment of the present invention.
Figure 2:
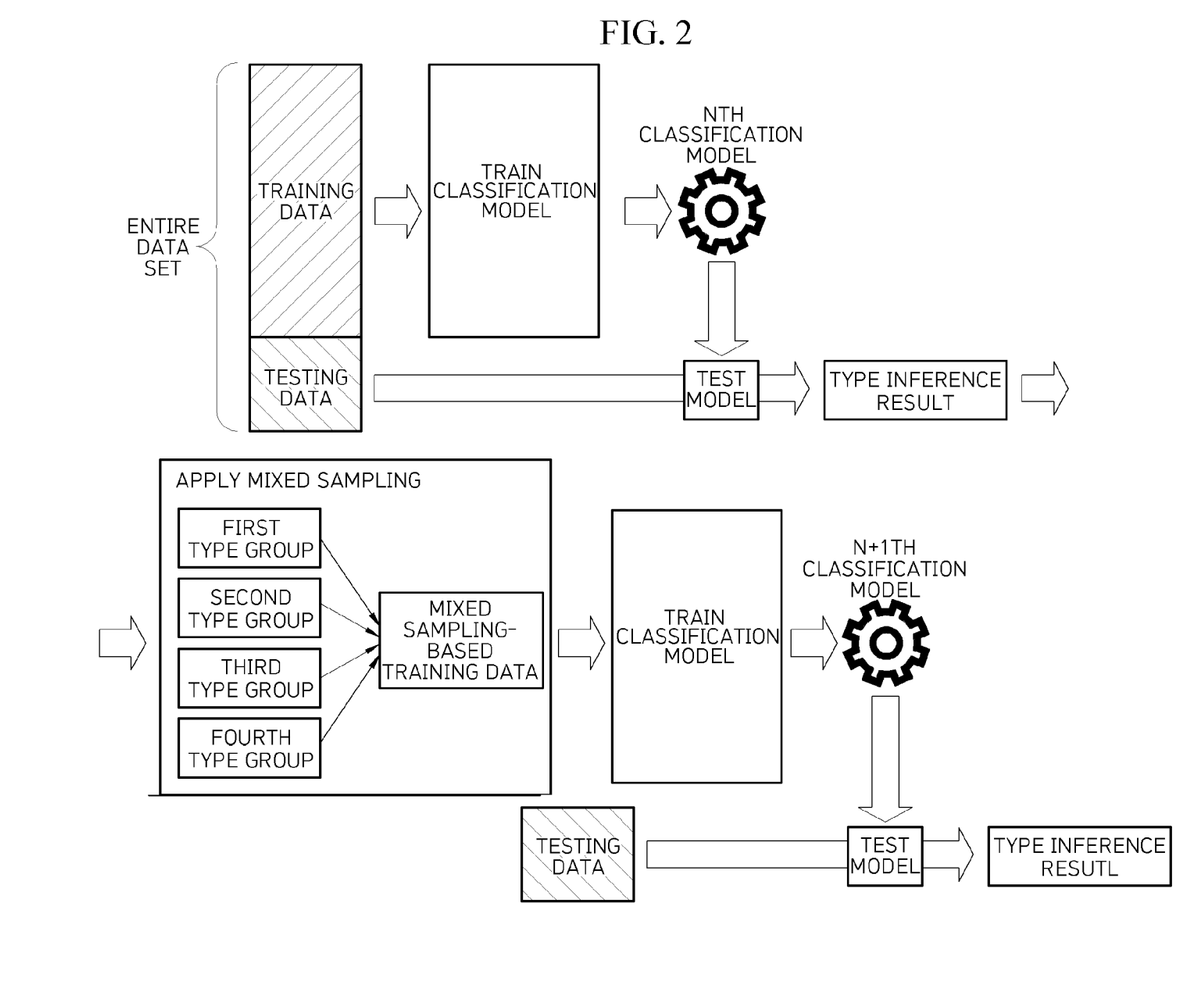
FIG. 2 is a diagram for describing the method of improving the performance of classification on the basis of mixed sampling according to the embodiment of the present invention.

FIG. 1 is a flowchart showing a method of improving the performance of classification on the basis of mixed sampling according to an embodiment of the present invention. FIG. 2 is a diagram for describing the method of improving the performance of classification on the basis of mixed sampling according to the embodiment of the present invention. FIGS. 3A and 3B are diagram illustrating an example of visualizing type inference result.

Meanwhile, each operation shown in FIG. 1 may be understood to be performed by an apparatus 100 for improving the performance of classification on the basis of mixed sampling described in FIG. 4 to be described below, but the present invention is not limited thereto.

First, the entire data set requiring classification is divided into training data and testing data (S110).

As an embodiment, in operation S110, the numbers of pieces of the training data according to types and the numbers of pieces of the testing data according to types may be divided in proportion to the distribution of data of the entire data set according to types.

After the training data and the testing data are divided as described above, the training data among the divided data is applied to a predetermined model learning technique to learn a plurality of classification models. That is, the training data among the divided data is used to learn a classification model through a predetermined model learning technique, according to the modality or feature of the data. According to the model learning process, a set of a plurality of classification models is stored in a model repository 122.

On the other hand, the embodiment of the present invention may use a bidirectional encoder representations from transformers (BERT) model, which has recently shown excellent performance in many natural language process (NLP) tasks, but the present invention is not limited thereto.

Next, an $N^{th}$ (N is a natural number) classification model is trained on the basis of the training data (S120). As an example, the training data may be subjected to fine tuning leaning on the basis of the pre-trained BERT model, so that the $N^{th}$ classification model may be trained.

Next, the testing data divided in the previous operation is set to an input of the $N^{th}$ classification model, and through a model testing process, type inference result is provided as a visualization (S130).

Next, characteristic information for each type group including the number of pieces of data to be learned and the classification inference performance of the $N^{th}$ classification model is evaluated to determine type groups (S140). In operation S140, a plurality of type groups divided by grades may be configured based on the type inference result.

Specifically, the type inference result of the classification model in the present invention may include a plurality of type groups including first to fourth type groups.

Referring to characteristic information for each type group of the respective groups constructed according to the embodiment, the first type group (Major class & HQ) is a group in which the number of pieces of data to be learned is relatively large compared to other type groups, and the classification inference performance is relatively high. The second type group (Major class & LQ) is a group in which the number of pieces of data to be learned is relatively large compared to other type groups, and the classification inference performance is relatively low. The third type group (Minor class & HQ) is a group in which the number of pieces of data to be learned is relatively small compared to other type groups, and the classification inference performance is relatively high. The fourth type group (Minor class & LQ) is a group in which the number of pieces of data to be learned is relatively small compared to other type groups, and the classification inference performance is relatively low.

Figure 3A:
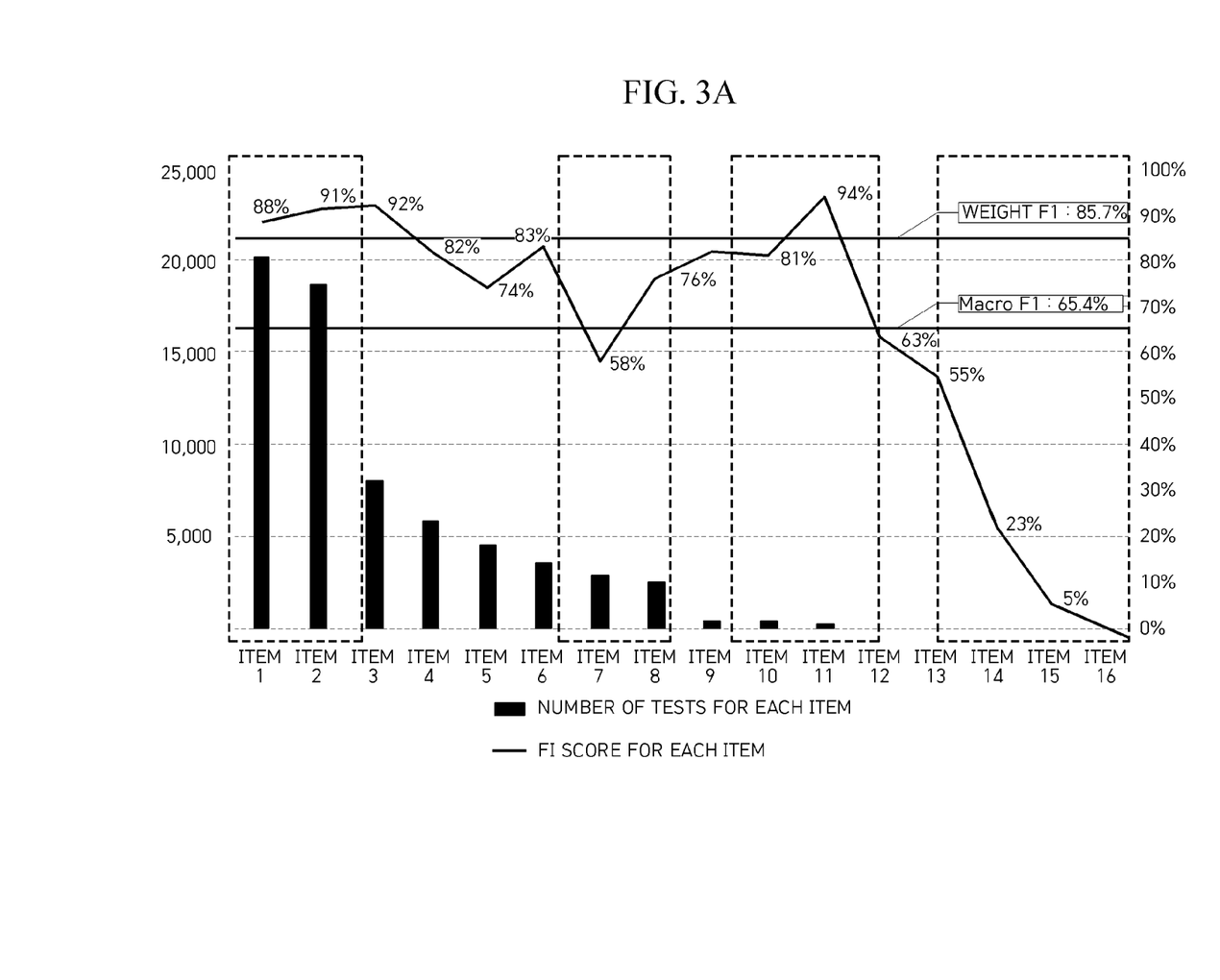
FIGS. 3A and 3B are diagram illustrating an example of visualizing type inference result.
Figure 3B:
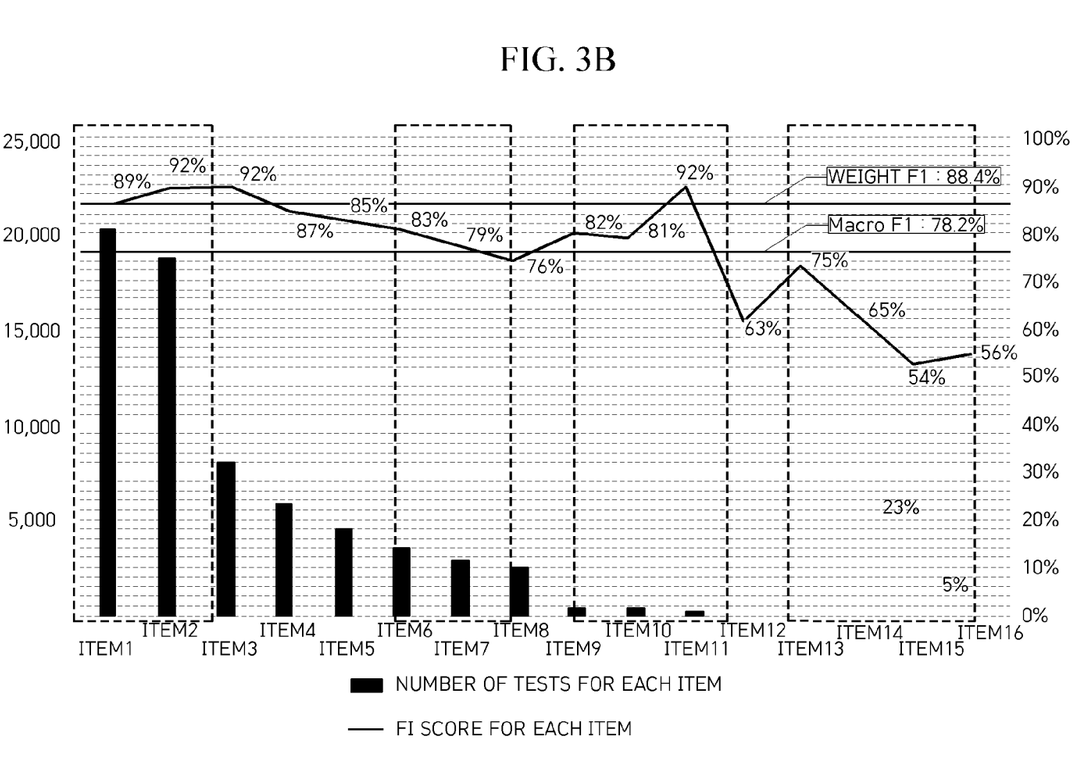

According to the embodiment, the type inference result is provided by visualizing the overall performance of the model and the classification performance for each type, as in the graph of "the number of tests and the classification performance evaluation for each item based on the $N^{th}$ classification model" shown in FIGS. 3A and 3B.

According to the embodiment, characteristic information for each type group of data included in the four type groups may be analyzed according to the visualization result that presents a result of applying the testing data on the basis of the Nth classification model.

In an embodiment, the first type group corresponds to a group having high exclusivity from other types and having a large amount of data. The second type group corresponds to a group having low exclusivity from other types, and particularly being in a relationship of inclusion with other types or requiring reclassification. According to an embodiment, actual domain data is mostly collected and stored without requirements for data learning and classification. In particular, actual domain data is generated when existing types are combined into one type or detailed types are added according to changes in society. In this case, a case in which accumulated data is learned and a case in which the same types of source data are assigned different types of labels often occur.

The third type group is a group having high exclusivity from other types and having a relatively small amount of data. The fourth type group is a group having very little influence on model training due to having an extremely small amount of data.

According to an embodiment of the present invention, a mixed sampling technique is applied to the type inference result based on the characteristic information for each of the respective type groups (S150).

Specifically, the under-sampling, data augmentation, and re-labeling techniques may be selectively applied to each of the type groups on the basis of the characteristic information for each of the plurality of type groups.

For example, the first type group may be subjected to the technique of under-sampling of randomly under-sampling training data for improving data learning speed and compensating for the performance of a type group with low inference performance due to having a low number of pieces of data according to the characteristic information for each type group described above. In this case, when the under-sampling technique is applied to the first type group, the size of the under-sampling needs to be selected in consideration of the possibility that the inference performance of the corresponding type group is lowered.

In addition, the second type group may be subjected to the technique of re-labeling. The second type group has a group characteristic of low exclusivity from other types, or low classification performance, or requirement of reclassification into other types and a large number of pieces of data. Therefore, in the case of the second type group, the relabeling technique may be appropriate for improving the accuracy. However, since the second type group has a large number of pieces of data, active learning, semi-supervised learning techniques, etc., may be used together with the re-labeling technique so that the number of pieces of data to be labeled is reduced while more efficient data is selected for learning.

The third type group may not be subjected to sampling, and may be allowed to be included in mixed sampling-based training data described below. That is, the third type group is a type group having high exclusivity from other types and having a small number of pieces of data, and thus is generally allowed to be included in training data without sampling.

The fourth type group has an extremely small number of pieces of data, and thus the data augmentation technique may be used to increase the influence of model training. In this case, use of the data augmentation technique of simply duplicating data may cause a fatal disadvantage that only the corresponding training data is overfitted. Accordingly, the embodiment of the present invention may selectively apply an appropriate augmentation technique to increase the number of pieces of training data for the fourth type group.

For example, in the case of text data, when there is a suitable synonyms dictionary or paraphrase dictionary for a language, the training data may be augmented by replacing a specific word. Alternatively, when the training data is tokenized and the order of token appearance is not important in training the classification model, the training data may be augmented by randomly changing the order of the tokens. In addition, the number of pieces of training data may be increased by deleting a certain portion of tokens or adding random tokens at a certain ratio. Alternatively, the number of pieces of the training data may be augmented by replacing a word having a similar vector through a word embedding algorithm, such as Word2Vec.

Next, the training data based on mixed sampling for an $N+1^{th}$ classification model, in which mixed sampling data according to a result of the application of the mixed sampling technique is concatenated, is reconstructed (S160), and the $N+1^{th}$ classification model is trained on the basis of the mixed sampling-based training data (S170). As an example, fine tuning task may be performed on the basis of a pre-trained BERT model so that the $N+1^{th}$ classification model may be trained, similar to the above-described method of training the $N^{th}$ classification model.

For the $N+1^{th}$ classification model trained in this way, the testing data divided in operation S110 is set to an input to provide type inference result (S180).

The type inference result according to operation S180 is provided by visualizing the overall performance of the model and the classification performance for each type, as in the graph of "the number of tests and the classification performance evaluation for each item based on the $N+1^{th}$ classification model" shown in FIGS. 3A and 3B.

Meanwhile, in the embodiment of the present invention, the mixed sampling process for re-training of the classification model is described as being performed once, but the present invention is not limited thereto, and appropriate selection of type groups and application of sampling techniques may be differentiated and repeatedly performed according to embodiments.

Meanwhile, in the above description, operations S110 to S180 may be further segmented into a larger number of operations or combined into a smaller number of operations according to examples of implementation of the present invention. In addition, some of the operations may be omitted or may be executed in the reverse order as needed. Parts omitted in the following description, which have been described above with reference to FIGS. 1 and 3, may be applied to the apparatus 100 for improving the performance of classification on the basis of mixed sampling according to the embodiment of the present invention.

Figure 4:
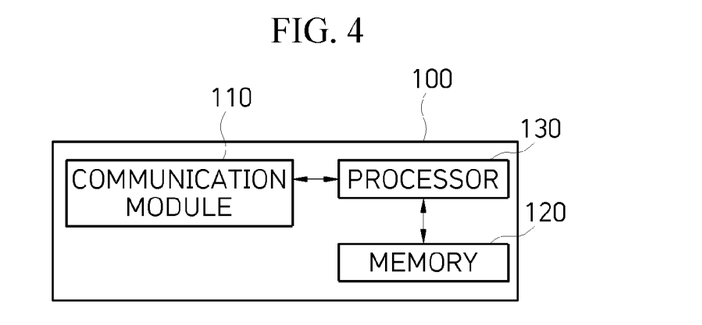
FIG. 4 is a block diagram illustrating an apparatus for improving the performance of classification on the basis of mixed sampling according to an embodiment of the present invention.
Figure 5:
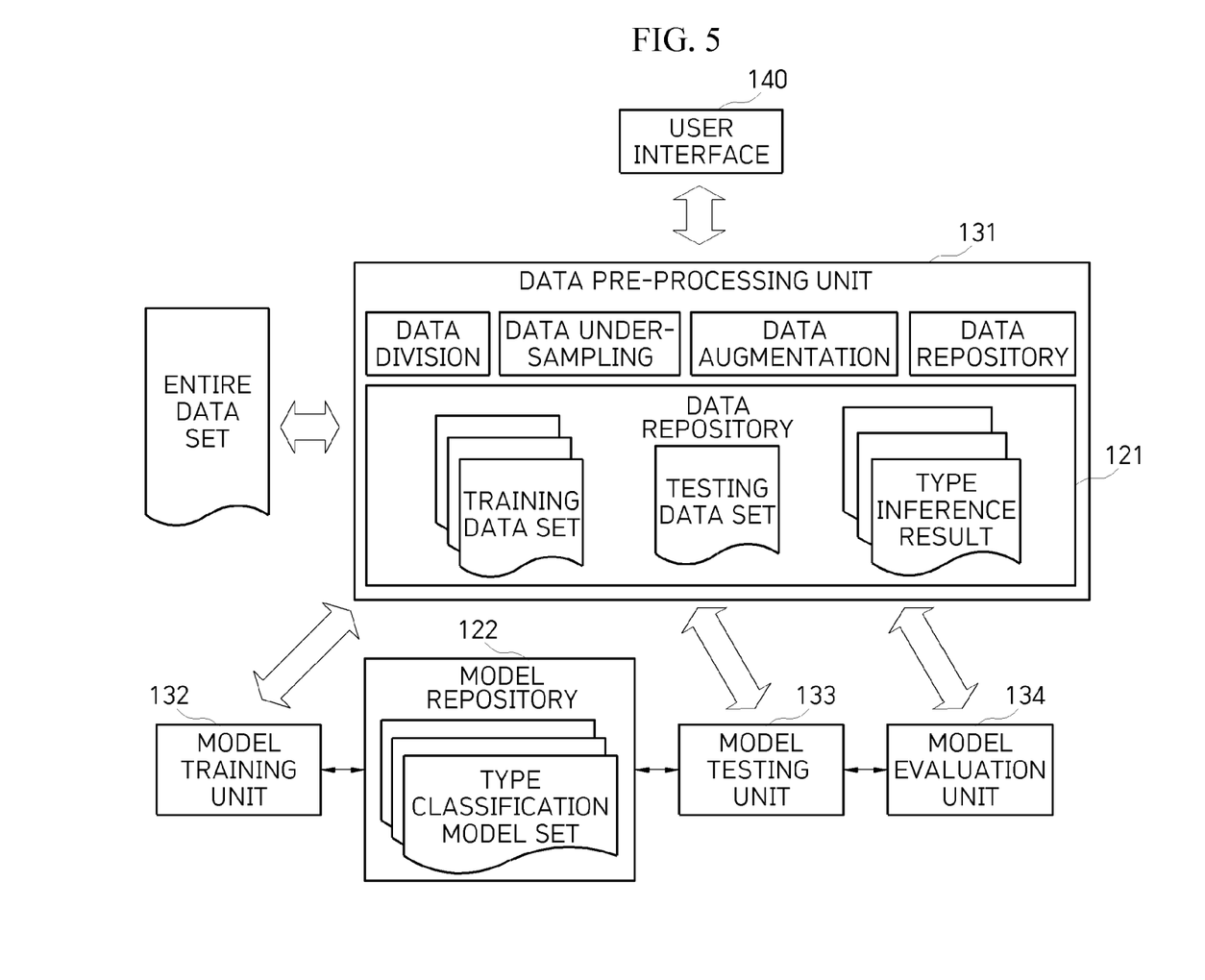
FIG. 5 is a diagram for describing functions of the apparatus for improving the performance of classification on the basis of mixed sampling according to the embodiment of the present invention.

FIG. 4 is a block diagram illustrating the apparatus 100 for improving the performance of classification on the basis of mixed sampling according to the embodiment of the present invention. FIG. 5 is a diagram for describing functions of the apparatus 100 for improving the performance of classification on the basis of mixed sampling according to the embodiment of the present invention.

The apparatus 100 according to the embodiment of the present invention may include a communication module 110, a memory 120, and a processor 130.

The processor 130 executes a program stored in the memory 120 to thereby divide the entire data set requiring classification into training data and testing data through a data pre-processing unit 131, perform training on the $N^{th}$ classification model on the basis of the training data through a model training unit 132, set the testing data to an input of the $N^{th}$ classification model to provide type inference result through a model testing unit 133, and evaluate characteristic information for each type group based on the type inference result through a model evaluation unit 134.

In addition, the processor 130 applies a mixed sampling technique to the type inference result and reconstructs the training data based on mixed sampling for an $N+1^{th}$ classification model, in which mixed sampling data according to a result of the application of the mixed sampling technique is concatenated, through the data pre-processing unit 131, performs training on the N+1$^{th}$ classification model on the basis of the mixed sampling-based training data through the model training unit 132, sets the testing data to an input of the N+1$^{th}$ classification model to provide type inference result through the model testing unit 133, and evaluates characteristic information for each type group based on the type inference result through the model evaluation unit 134.

In addition, the embodiment of the present invention may further include a user interface 140 that receives a selective application of a mixed sampling technique from a user and provides respective type inference result inferred by the N$^{th}$ classification model and the N+1$^{th}$ classification model as a visualization graph type.

The method of improving the performance of classification on the basis of mixed sampling according to the embodiment of the present invention described above may be implemented as a program (or an application) to be executed in combination with a computer, which is hardware, and stored in a medium.

The program may include codes coded in a computer language, such as C, C++, Java, Python, another machine language, etc., that can be read by a processor (e.g., a central processing unit (CPU) or a graphics processing unit (GPU)) of a computer through a device interface of the computer in order for the computer to read the program and execute the methods implemented as the program. The code may include a functional code that is related to a function that defines functions needed to execute the methods and may include an execution-procedure-related control code needed to cause the processor of the computer to execute the functions according to a predetermined procedure. In addition, the code may further include a memory-reference-related code indicating whether additional information or media needed to cause the processor of the computer to execute the functions should be referred to at a location (an address) of an internal or external memory of the computer. In addition, when the processor of the computer needs to communicate with any other computers or servers, etc. at a remote site, to perform the above-described functions, the code may further include communication-related codes such as how to communicate with any other computers or servers at a remote site and what information or media should be transmitted or received during communication.

The storage medium is not a medium that stores data for a short period of time, such as a register, cache, memory, etc., but is a medium that stores data semi-permanently and can be read by a device. Specifically, examples of the storage medium include may include a read-only memory (ROM), a random-access memory (RAM), a compact disc (CD)-ROM, a magnetic tape, a floppy disk, an optical data storage device, etc., but the storage medium is not limited thereto. That is, the program may be stored in various recording media on various servers which the computer can access or on various recording media on the computer of the user. In addition, the media may be distributed over computer systems connected through a network so that computer-readable codes may be stored in a distributed manner.

The above description of the invention is for illustrative purposes, and a person having ordinary skill in the art should appreciate that other specific modifications can be easily made without departing from the technical spirit or essential features of the invention. Therefore, the above-described embodiments should be regarded as illustrative rather than limitative in all aspects. For example, components which have been described as being a single unit can be embodied in a distributed form, whereas components which have been described as being distributed can be embodied in a combined form.

As is apparent from the above, according to the above-described embodiment of the present invention, when actual data is to be applied to a deep learning model, the distribution of types of training data, the inference accuracy for each type, and the like are first evaluated, a mixed sample method of using appropriate sampling techniques for different type groups is performed to construct training data, and the corresponding training data is used to perform model training, so that the reference performance can be further improved.

The effects of the present invention are not limited to those described above, and other effects not described above will be clearly understood by those skilled in the art from the above detailed description.

The scope of the present invention is not defined by the detailed description as set forth above but by the accompanying claims of the invention. It should also be understood that all changes or modifications derived from the definitions and scope of the claims and their equivalents fall within the scope of the invention.

What is claimed is:

1. A method of improving performance of classification on the basis of mixed sampling, which is performed by a computer, the method comprising:
    dividing an entire data set requiring classification into training data and testing data;
    training an N$^{th}$ classification model on the basis of the training data;
    setting the testing data to an input of the N$^{th}$ classification model to provide a type inference result;
    applying a mixed sampling technique to the type inference result based on characteristic information for each type group of the type inference result;
    reconstructing the training data based on mixed sampling for an N+1$^{th}$ classification model in which mixed sampling-based data according to a result of the applying of the mixed sampling technique is concatenated;
    training the N+1th classification model on the basis of the mixed sampling-based training data; and
    setting the testing data to an input of the N+1th classification model to provide the type inference result;
    wherein the setting of the testing data to the input of the N$^{th}$ classification model to provide the type inference result includes providing a type inference result including a plurality of type groups distinguished by grades according to the characteristic information for each type group including a number of pieces of data to be learned and a classification inference performance of the N$^{th}$ classification model; and
    wherein the plurality of type groups include a first type group, a second type group, a third type group, and a fourth type group,
    wherein the first type group is a group in which the number of pieces of the data to be learned is relatively large, and a type inference performance is relatively high,
    the second type group is a group in which the number of pieces of the data to be learned is relatively large, and the type inference performance is relatively low,
    the third type group is a group in which the number of pieces of the data to be learned is relatively small, and the type inference performance is relatively high, and the fourth type group is a group in which the number of pieces of the data to be learned is relatively small, and the type inference performance is relatively low.

2. The method of claim 1, wherein the dividing of the entire data set, which is a target for the classification, into the training data and the testing data includes dividing numbers of pieces of the training data according to types and numbers of pieces of the testing data according to types in proportion to a distribution of numbers of pieces of data in the entire data set according to types.

3. The method of claim 1, further comprising applying the training data to a predetermined model learning technique to learn a plurality of classification models.

4. The method of claim 1, wherein the applying of the mixed sampling technique to the type inference result on the basis of the characteristic information for each type group of the type inference result includes selectively applying a technique of under-sampling, a technique of data augmentation, and a technique of re-labeling to each of the type groups on the basis of the characteristic information for each type group of the plurality of type groups.

5. The method of claim 4, wherein the applying of the mixed sampling technique to the type inference result on the basis of the characteristic information for each type group of the type inference result includes:
   applying the technique of under-sampling to the first type group to randomly under-sample training data;
   applying the technique of re-labeling to the second type group;
   allowing the third type group to be included in the mixed sampling-based training data without sampling; and
   applying the technique of data augmentation to the fourth type group.

6. The method of claim 1, further providing each of the pieces of type inference result inferred by the $N^{th}$ classification model and the $N+1^{th}$ classification model as a visualization graph type.

7. An apparatus for improving performance of training data classification on the basis of mixed sampling, the apparatus comprising:
   a communication module;
   a memory; and
   a processor for executing a program stored in the memory, wherein the processor is configured to, according to execution of the program:
   divide an entire data set requiring classification into training data and testing data through a data pre-processing unit, train an $N^{th}$ classification model on the basis of the training data through a model training unit, set the testing data to an input of the $N^{th}$ classification model to provide a type inference result through a model testing unit, and evaluate characteristic information for each type group based on the type inference result to determine type groups through a model evaluation unit; and
   apply a mixed sampling technique to the training data and reconstruct the training data based on mixed sampling for an N+1th classification model, in which mixed sampling-based data according to a result of the application of the mixed sampling technique is concatenated, through the data pre-processing unit, train the N+1th classification model on the basis of the mixed sampling-based training data through the model training unit, and set the testing data to an input of the N+1th classification model to provide the type inference result through the model testing unit;
   wherein the model testing unit provides a type inference result including a plurality of type groups distinguished by grades according to the characteristic information for each type group including a number of pieces of data to be learned and a classification inference performance of the $N^{th}$ classification model;
   wherein the plurality of type groups include a first type group, a second type group, a third type group, and a fourth type group,
   wherein the first type group is a group in which the number of pieces of the data to be learned is relatively large, and the type inference performance is relatively high,
   the second type group is a group in which the number of pieces of the data to be learned is relatively large, and the type inference performance is relatively low,
   the third type group is a group in which the number of pieces of the data to be learned is relatively small, and the type inference performance is relatively high, and
   the fourth type group is a group in which the number of pieces of the data to be learned is relatively small, and the type inference performance is relatively low.

8. The apparatus of claim 7, wherein the data pre-processing unit divides numbers of pieces of the training data according to types and numbers of pieces of the testing data according to types in proportion to a distribution of numbers of pieces of data in the entire data set according to types.

9. The apparatus of claim 7, wherein the data pre-processing unit applies the training data to a predetermined model learning technique to learn a plurality of classification models.

10. The apparatus of claim 7, wherein the data pre-processing unit selectively applies a technique of under-sampling, a technique of data augmentation, and a technique of re-labeling to each of the type groups on the basis of the characteristic information for each type group of the plurality of type groups.

11. The apparatus of claim 10, wherein the data pre-processing unit is configured to:
   apply the technique of under-sampling to the first type group to randomly under-sample training data;
   apply the technique of re-labeling to the second type group;
   allow the third type group to be included in the mixed sampling-based training data without sampling; and
   apply the technique of data augmentation to the fourth type group.

12. The apparatus of claim 7, further comprising a user interface configured to provide each of pieces of type inference result inferred by the $N^{th}$ classification model and $N+1^{th}$ classification model as a visualization graph type.

* * * * *